(12) United States Patent
Yin

(10) Patent No.: US 7,352,565 B2
(45) Date of Patent: Apr. 1, 2008

(54) PORTABLE COMPUTER SYSTEM

(75) Inventor: Memphis-Zhihong Yin, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 27 days.

(21) Appl. No.: 10/952,212

(22) Filed: Sep. 28, 2004

(65) Prior Publication Data
US 2006/0067037 A1    Mar. 30, 2006

(51) Int. Cl.
*G06F 1/16*    (2006.01)
(52) U.S. Cl. ............... 361/683; 312/223.2; 248/917
(58) Field of Classification Search ........... 361/686, 361/679–683, 724, 725; 312/223.1, 223.2; 248/917–923
See application file for complete search history.

(56) References Cited

U.S. PATENT DOCUMENTS

| 5,247,285 A | 9/1993 | Yokota et al. |
| 5,627,450 A | 5/1997 | Ryan et al. |
| 6,076,787 A | 6/2000 | Troyer |
| 6,185,094 B1 | 2/2001 | Ruch et al. |
| 6,208,508 B1 | 3/2001 | Ruch et al. |
| 6,256,192 B1 | 7/2001 | Shannon |
| 6,256,193 B1 * | 7/2001 | Janik et al. ............. 361/683 |
| 6,353,529 B1 * | 3/2002 | Cies ....................... 361/681 |
| 6,480,376 B1 | 11/2002 | Nguyen et al. |
| 6,583,985 B2 | 6/2003 | Nguyen et al. |
| 6,825,415 B1 * | 11/2004 | Chen et al. ............... 174/63 |
| 6,912,121 B2 * | 6/2005 | Karidis et al. ........... 361/681 |
| 2003/0103328 A1 | 6/2003 | Hillis et al. |

FOREIGN PATENT DOCUMENTS

EP    1333356    8/2003

* cited by examiner

*Primary Examiner*—Jayprakash Gandhi
*Assistant Examiner*—Anthony Q Edwards

(57) ABSTRACT

A portable computer system comprising a main chassis with a front edge, a rear edge, an upper surface, and a lower surface. A support chassis is rotatably connected to the front edge of the main chassis. A display panel is rotatably connected to the rear edge of the main chassis.

19 Claims, 3 Drawing Sheets

PORTABLE COMPUTER SYSTEM

BACKGROUND

Portable computers are compact, lightweight computing devices and may comprise any portable electronic device, for example, notebook computers, personal digital assistants, tablet personal computers, and laptop computers. Although designed for portability and mobile uses, many people use portable computers in desktop environments. The use of portable computers in desktop environments has always created challenges with ergonomics and ease of use. Many of the features that make portable computers useful mobile tools, for example, compact size and integrated components, can be limitations when used in a desktop environment.

Portable computer stands and docking stations have been developed to ease the use of a portable computer in a desktop environment. Many of these stands and docking stations provide interfaces with peripheral equipment, for example, input devices, networks, printers, and additional display devices, that enables the portable computer to be more easily used as a traditional desktop system. Stands and docking stations that are designed for stationary use in a desktop environment are not easily transportable.

SUMMARY

Therefore, as can be appreciated, there is a need for a portable computer stand that enables ergonomic use of a portable computer in a variety of environments. The problems noted above are solved in large part by a portable computer system comprising a main chassis having a front edge, a rear edge, an upper surface, and a lower surface. A support chassis is rotatably connected to the front edge of the main chassis. A display panel is rotatably connected to the rear edge of the main chassis.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

Figure 1:
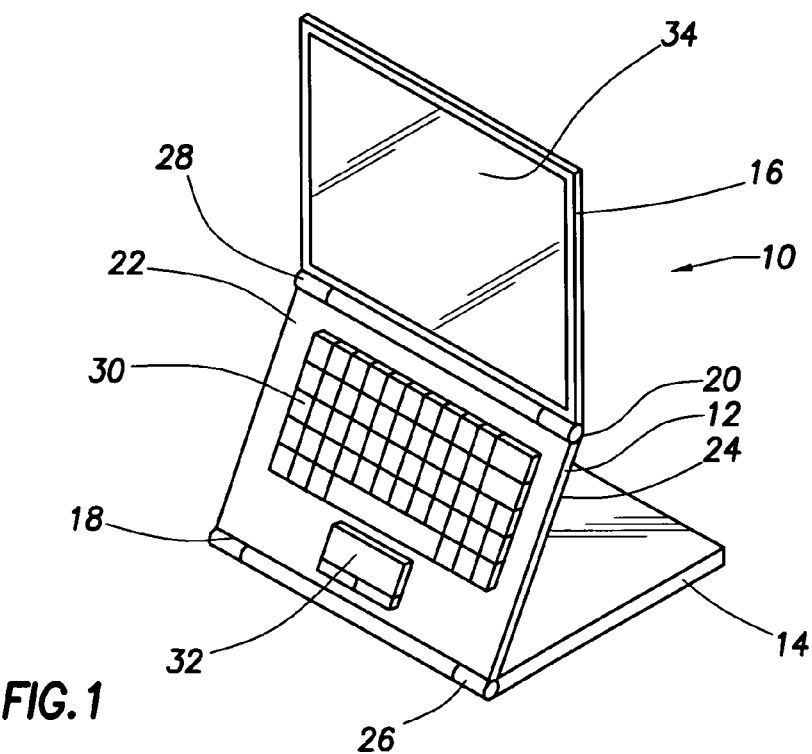
FIG. 1 illustrates a portable computer system in an expanded position in accordance with embodiments of the invention.

The following discussion is directed to various embodiments of the invention. Referring now to FIG. 1 a portable computer system 10 is shown comprising main chassis 12, support chassis 14, and display panel 16. Main chassis 12 comprises front edge 18, rear edge 20, upper surface 22, and lower surface 24. Support chassis 14 is disposed adjacent to lower surface 24 and rotatably connected to front edge 18 by hinge 26. Display panel 16 is disposed adjacent to upper surface 22 and rotatably connected to rear edge 20 by hinge 28. Input devices, for example, keyboard 30 and/or touch pad 32, are disposed on upper surface 22 of main chassis 12. Display screen 34 is disposed on display panel 16.

Computer system 10 is shown in FIG. 1 in an expanded position where support chassis 14 is disposed on a substantially horizontal surface, e.g., a desktop. Main chassis 12 is disposed at an angle to support chassis 14 such that the main chassis is in an elevated, inclined position. Display panel 16 is positioned in a substantially vertical position. The extended position may be useful when system 10 is being used on relatively flat work surface, for example, a desk or table. Main chassis 12 can be positioned at an elevated angle that promotes ergonomic use of keyboard 30 and/or touch pad 32. Display panel 16 is elevated to an ergonomic viewing height and can be tilted to a desired viewing angle.

The angle formed between main chassis 12 and support chassis 14 is maintained by a locking system integrated into hinge 26. The angle formed between main chassis 12 and display panel 16 is maintained by a locking system integrated into hinge 28. Hinges 26, 28 may have a user-activated, positively-engaged, locking systems or may utilize friction forces to automatically maintain the relative position of the respective chassis. Other locking systems, integrated into hinges 26, 28 and/or external to the hinges may also be used. Hinges 26, 28 may be detachable hinges such that support chassis 14 and/or display panel 16 can be detached from main chassis 12.

Figure 2:
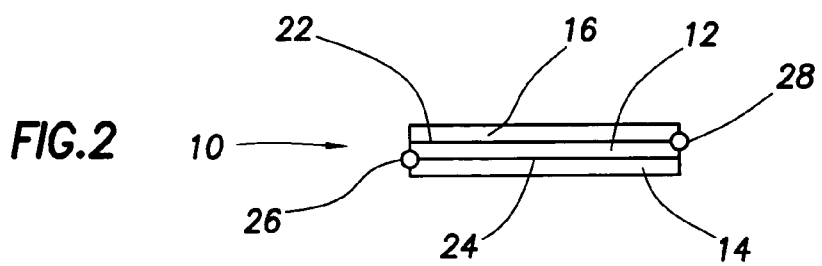
FIG. 2 illustrates the portable computer system of FIG. 1 in a collapsed position.

Referring now to FIG. 2, portable computer system 10 is shown in a collapsed position suitable for transporting the system. Display panel 16 is disposed parallel and adjacent to upper surface 22 of main chassis 12. Support chassis 14 is disposed parallel and adjacent to lower surface 24 of main chassis 12.

Figure 3:
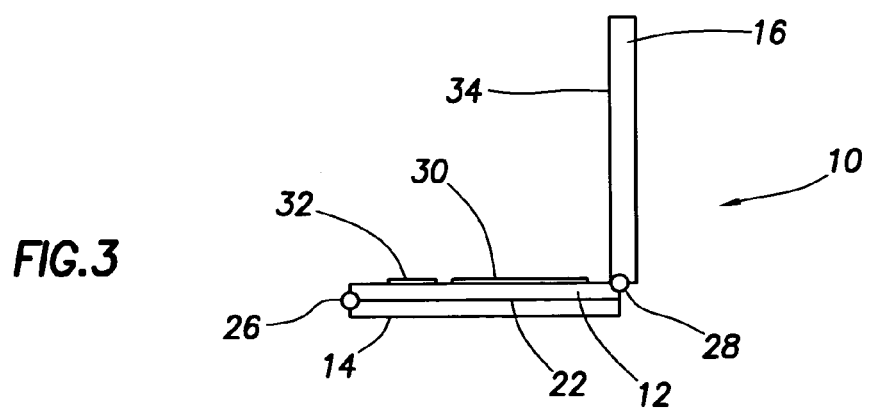
FIG. 3 illustrates the portable computer system of FIG. 1 in a partially expanded position.

Referring now to FIG. 3, portable computer system 10 is shown in a partially extended position suitable for mobile use. Support chassis 14 is disposed parallel and adjacent to lower surface 24 of main chassis 12. Display panel 16 is rotated to an upright position that enables access to keyboard 30 and/or touch pad 32 and viewing of display screen 34.

Therefore, system 10 supports a collapsed position, an example of which is shown in FIG. 2, a partially expanded position, an example of which is shown in FIG. 3, and an expanded position, an example of which is shown in FIG. 1. In the arrangement shown, system 10 provides a customizable package that enables use of the system in a variety of configurations. Certain embodiments of system 10 provide multiple configurations in a single chassis system without any external stands or supports. In alternate embodiments, the support chassis is detachable and could thus be stored separate from the system when not in use. Thus, portable computer system 10 provides a portable computer system that provides additional flexibility in a single, customizable package.

Figure 4:
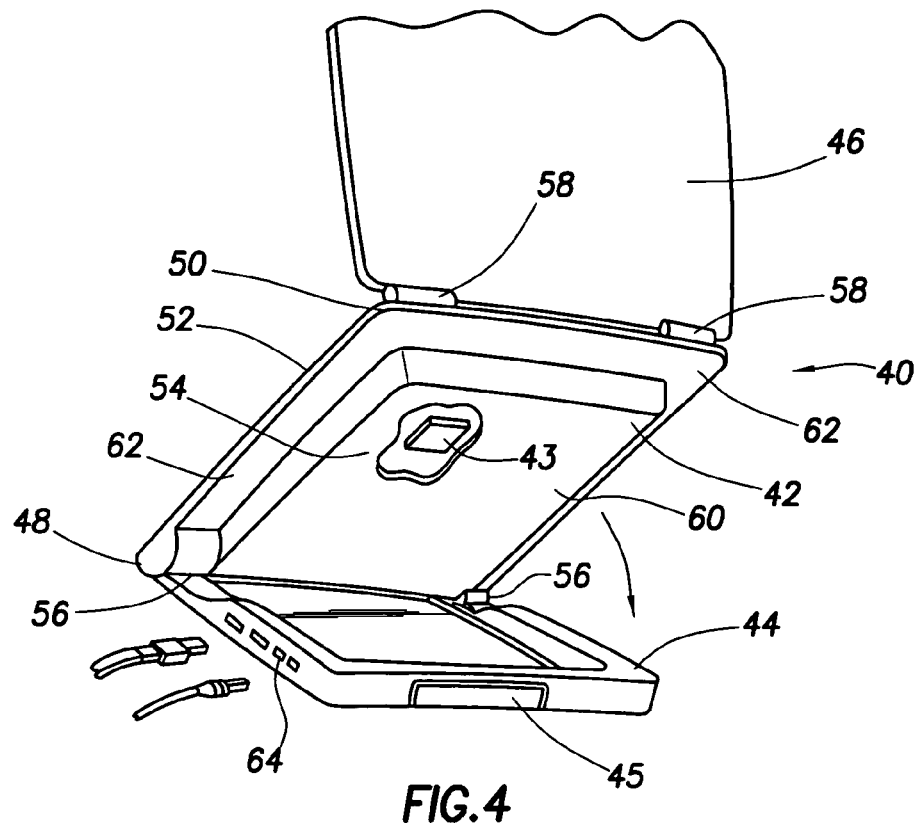
FIG. 4 illustrates a portable computer system in an expanded position in accordance with embodiments of the invention.
Figure 5:
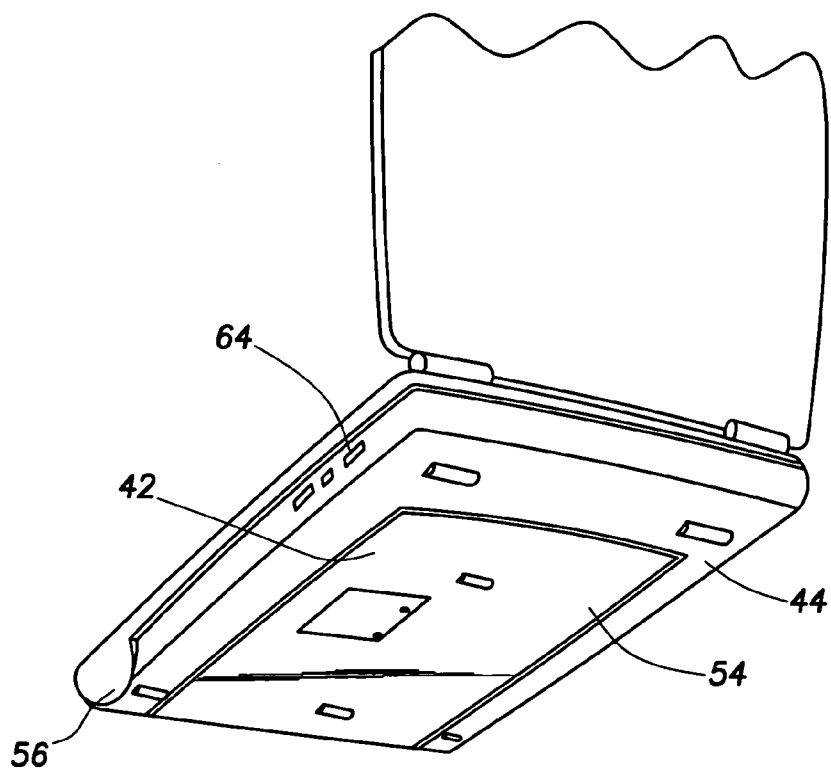
FIG. 5 illustrates the portable computer system of FIG. 4 in a collapsed position.

Referring now to FIG. 4, portable computer system 40 comprises main chassis 42, support chassis 44, and display panel 46. Support chassis 44 connects to front edge 48 of main chassis 42 by hinges 56. Support chassis 44 is disposed at an acute angle to lower surface 54. Display panel 46 is rotatably connected to rear edge 50 by hinges 58 and forms an obtuse angle with upper surface 52 of main chassis 42. Hinges 56, 58 may alternatively enable support chassis 44 and/or display panel 46 to detach from main chassis 42.

Lower surface 54 of main chassis 42 also comprises protruding center portion 60 and recessed perimeter portions 62. Main chassis 42 encloses the operating components of the computer system, for example, processor 43, memory, data storage, and other electronic components. Support chassis 44 may enclose selected electric components, for example battery 45, or other power supply, and may also have ports 64 that couple the system to a peripheral component, for example, a printer, external storage component, keyboard, or external power supply.

Support chassis 44 is preferably sized so as to closely fit within recessed perimeter portions 62 such that when the support chassis is closed against main chassis 42, the base of the support chassis is substantially co-planar with lower surface 54 of the main chassis. Therefore, support chassis 44 and main chassis 42 can be positioned parallel to each other within the thickness of main chassis 42. Thus, system 40 provides a portable computer with an integral stand within the conventional clam-shell type form factor that is familiar to users.

Figure 6:
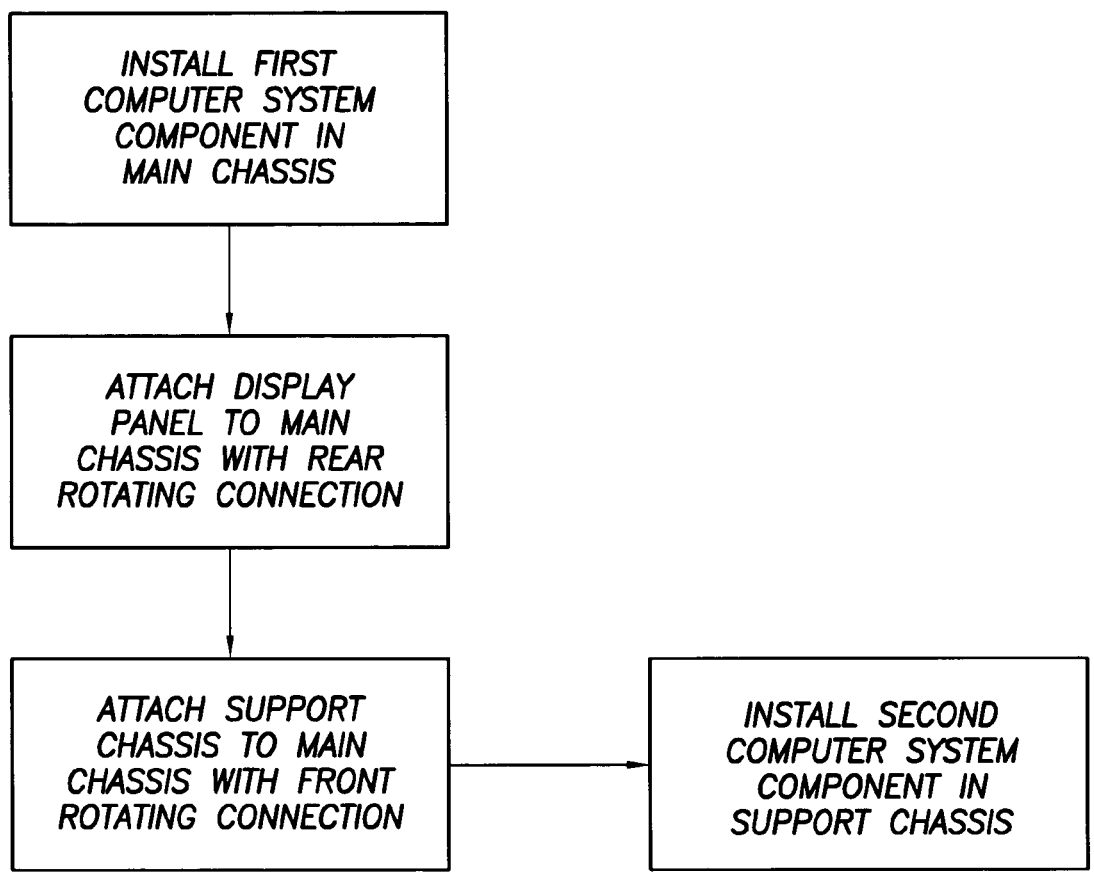
FIG. 6 illustrates a method for constructing a computer system in accordance with embodiments of the invention.

Referring now to FIG. 6, a computer system is assembled by attaching a main chassis to a support chassis with a first rotating connection. A display panel is attached to the main chassis with a second rotating connection. The first rotating connection is disposed on a front edge of the main chassis and the second rotating connection is disposed on a rear edge of the main chassis. A first computer system component, such as a processor, is installed in the main chassis. A second computer system component, such as a battery or external connector, is installed in the support chassis. The first computer system component is communicatively coupled to the second computer system component. The computer system can be assembled in any arrangement or order. In some embodiments, certain components may be temporarily installed or removably connected to the computer.

The computer system can be positioning in a collapsed position wherein the support chassis and the display panel are substantially parallel to, and preferably on opposite sides of, the main chassis. The computer system can also be deployed by positioning the computer system in an expanded position wherein the support chassis is at an angle to and below the main chassis and the display panel is at an angle to and above the main chassis.

The above discussion is meant to be illustrative of the principles and various embodiments of the present invention. Numerous variations and modifications will become apparent to those skilled in the art once the above disclosure is fully appreciated. For example, an adjustable computer stand may be easily configured for use with a variety of portable computer systems, for example, other types of portable systems, notepad systems, personal digital assistants, and other equipment.

What is claimed is:

1. A portable computer system comprising:
    a main chassis comprising a front edge, a rear edge, an upper surface, and a lower surface having a protruding portion that defines a recessed perimeter portion;
    a support chassis rotatably connected to the front edge of said main chassis, the support chassis comprising a lip disposed around at least a portion of the perimeter of the support chassis, the lip defining a recess; and
    a display panel rotatably connected to the rear edge of said main chassis;
    wherein the protruding portion of said main chassis is at least partially positionable within the recess of said support chassis; and
    wherein the lip of said support chassis fits at least partially within the recessed perimeter portion of said main chassis.

2. The portable computer system of claim 1 further comprising an input device disposed on the upper surface of said main chassis.

3. The portable computer system of claim 1 wherein the system has a first position wherein said support chassis is adjacent to the lower surface of said main chassis and said display panel is adjacent to the upper surface of said main chassis.

4. The portable computer system of claim 3 wherein in the first position the support chassis is positioned within the thickness of the main chassis.

5. The portable computer system of claim 3 wherein the system has a second position wherein said main chassis forms an angle with said support chassis and said display panel forms an angle with said main chassis.

6. The portable computer system of claim 5 wherein in the second position, said support chassis is oriented horizontally.

7. The portable computer system of claim 1 further comprising:
    processor disposed within said main chassis and communicatively coupled to said input device and said display panel; and
    an electrical component disposed within said support chassis and communicatively coupled to said processor.

8. The portable computer system of claim 7 wherein said electrical component is a power supply.

9. The portable computer system of claim 8 wherein the power supply is a battery.

10. The portable computer system of claim 7 wherein the electrical component is a port that couples said processor to a peripheral component.

11. A method for constructing a portable computer system comprising:
    attaching a main chassis to a support chassis with a first rotating connection disposed on a front edge of the main chassis;
    attaching a display panel to the main chassis with a second rotating connection disposed on a rear edge of the main chassis; and
    closing the support chassis against the main chassis so that a lip disposed around at least a portion of the perimeter of the support chassis fits within a first recess defined by a protruding portion of the main chassis and the protruding portion of the main chassis fits within a second recess defined by the lip of the support chassis.

12. The method of claim 11 wherein the computer system can be disposed in a collapsed position wherein the support chassis and the display panel are on opposite sides of the main chassis.

13. The method of claim 11 wherein the computer system can be disposed in an expanded position wherein the support chassis is at an angle to and below the main chassis and the display panel is at an angle to and above the main chassis.

14. The method of claim 11 further comprising:
   installing a first computer system component in the main chassis;
   installing a second computer system component in the support chassis; and
   communicatively coupling the first computer system component to the second computer system component.

15. The method of claim 14 wherein the second computer system component is a battery.

16. The portable computer system of claim 3 wherein, when the system is in the first position, the lip of said support chassis is disposed within the recessed perimeter portion of said main chassis.

17. The portable computer system of claim 3 wherein the lower surface of said main chassis is co-planar with a base of said support chassis when the system is in the first position.

18. The method of claim 12 wherein, in the collapsed position, the support chassis is disposed within the first recess of the main chassis.

19. The method of claim 12 wherein, the lower surface of the main chassis is co-planar with a base of said support chassis when the system is in the collapsed position.

* * * * *